Feb. 11, 1964   H. F. FLOWERS   3,120,822
FLUID MOTOR VALVE CUT-OFF FOR TILTING DUMPING MACHINES
Filed Oct. 10, 1958   6 Sheets-Sheet 1
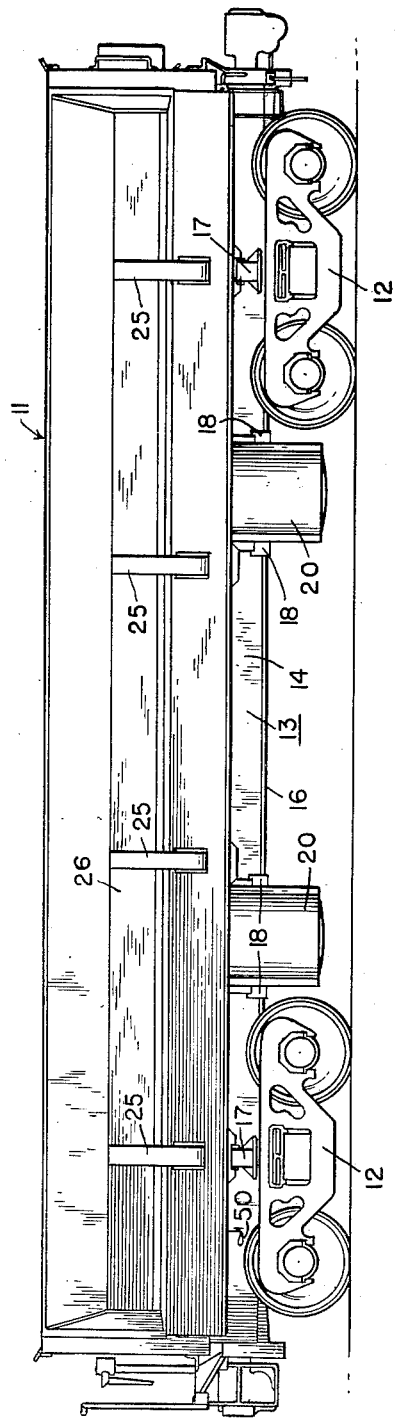
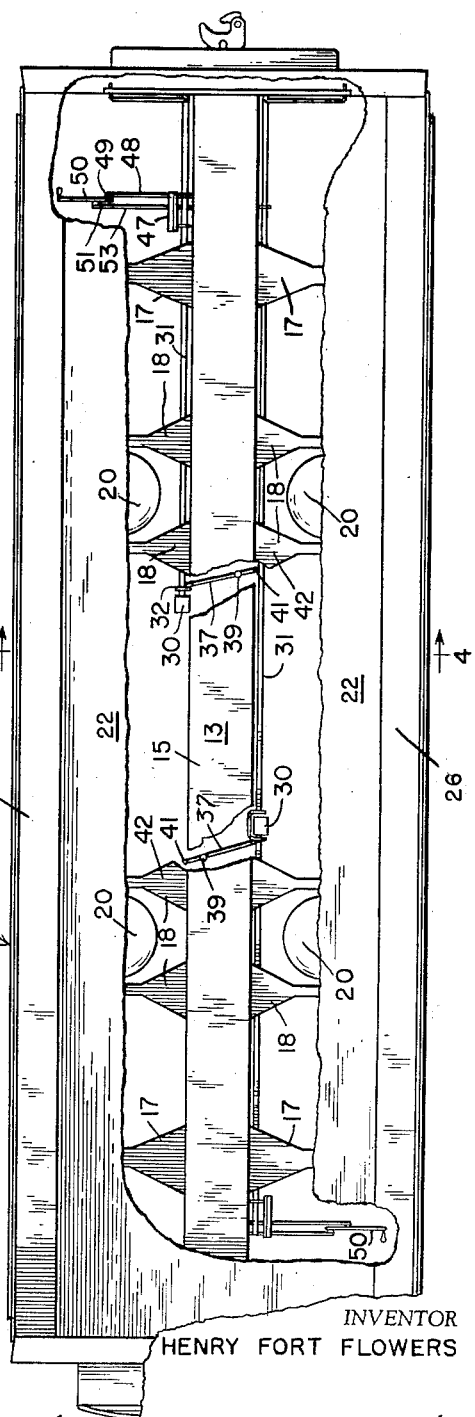
INVENTOR
HENRY FORT FLOWERS
BY Mason, Porter, Miller & Stewart
ATTORNEYS

HENRY FORT FLOWERS
INVENTOR

Feb. 11, 1964    H. F. FLOWERS    3,120,822
FLUID MOTOR VALVE CUT-OFF FOR TILTING DUMPING MACHINES
Filed Oct. 10, 1958    6 Sheets-Sheet 5

HENRY FORT FLOWERS
INVENTOR

BY *Mason, Porter, Miller & Stewart*

ATTORNEYS

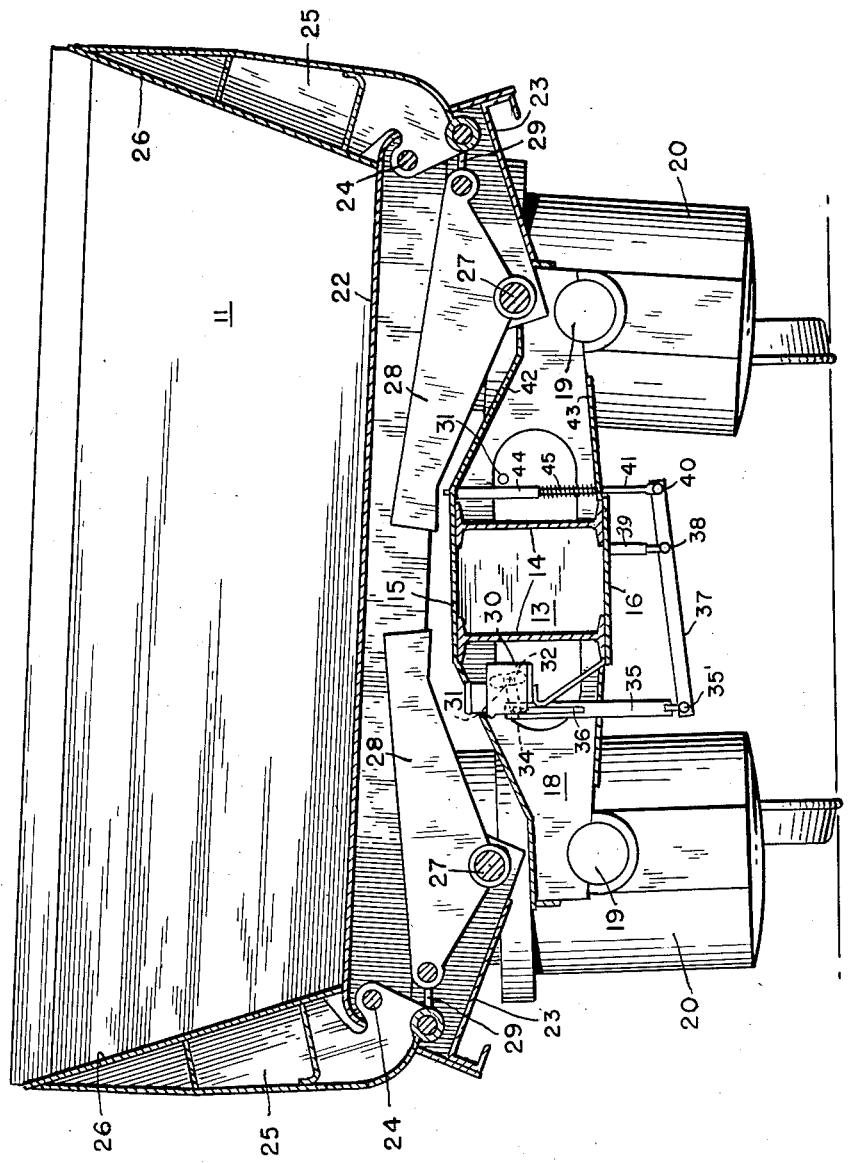

__United States Patent Office__  3,120,822
Patented Feb. 11, 1964

3,120,822
FLUID MOTOR VALVE CUT-OFF FOR TILTING DUMPING MACHINES
Henry Fort Flowers, Box 238, Findlay, Ohio
Filed Oct. 10, 1958, Ser. No. 766,504
6 Claims. (Cl. 105—273)

The following specification describes in detail an improvement in a valve cut-off for dump vehicles. It is particularly applied for improving the safety and certainty of operation of dump cars for transporting coal, sand and the like materials and discharging the load selectively to either side of the roadway or track upon which the vehicle is moved.

It frequently happens that material of the above nature becomes frozen in the car, or the door operating linkage fails, whereupon the door does not open despite the normal tilting of the vehicle body. In such cases the car with its retained load becomes unbalanced and frequently overturns.

Where the loaded car is tilted by air pressure, the final tilting movement frequently occurs with increased rapidity while the load is discharging. This rapid tilting results in a severe shock at the end of the dumping movement, thus damaging the vehicle and often causing the car to derail.

It will of course be also apparent that in such accelerated movement, the air pressure in the dump cylinders is not cut off quickly enough, thus resulting in several times as much air being applied as actually is required to complete the dumping of the car.

There is also the likelihood that when there is an incomplete discharge of the material through the down-tilting door, or because of abnormal friction of the moving parts, the dump vehicle fails to return to its normal horizontal position from the fully tilted position despite the fact that the dump valve may have returned to its normally inoperative position. When this happens, inexperienced operators sometimes apply fluid pressure to the dump valve on the opposite side of the car, so that the body will get a light shock thus breaking the frictional resistance which prevents the return. If the valve last operated is left on inlet position, the air pressure will lift the dump body off both trunnions damaging the dumping cylinders and the door operating linkages.

It is an object of my invention to provide means for cutting off the air to the operating dump cylinders at a predetermined angle of the dumping body after the down-tilting door has opened fully.

Another object of the invention is to provide a cut-off means that will be actuated automatically in case the door on the down tilting side fails to open because of failure of the door control mechanism or in the event of freezing of the material in the load.

A still further object of the invention is to provide a valve cut-off means that can be overridden by the application of increased force to the control handle of the dump valve.

Among the objects of my invention is to provide a cut-off means that acts to prevent operation of the dump valve controlling the opposite direction of tilting from that in which the car body has already been tilted. In other words, the improved mechanism will prevent air being introduced to both dump cylinders on opposite sides of the car at the same time. These and other objects of the invention will be apparent from the following description of the preferred form as illustrated by way of example in the accompanying drawings in which:

FIG. 1 is a side elevation of a dump vehicle with the improved cut-off for the dumping valve;

FIG. 2 is a top plan view of the same with the vehicle bottom cut away to show the cut-off mechanism;

FIG. 7 is a transverse vertical section on the line 4—4 in FIG. 2 of the vehicle with the body tilted about five degrees and the door opening freely and FIG. 8 is a transverse vertical section on the line 4—4 in FIG. 2 of the vehicle with the body tilted about five degrees and the door frozen shut.

Figure 3:
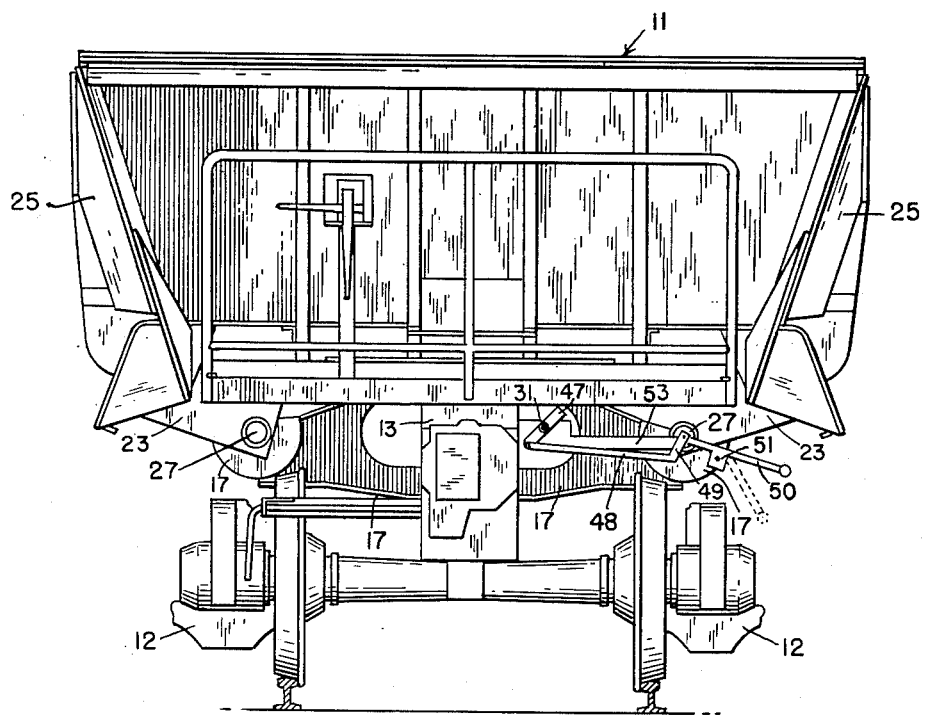
FIG. 3 is an elevation of the dump vehicle loaded.

Briefly described the invention consists in means by which the introduction of fluid pressure to the dumping cylinder of the vehicle is retarded or stopped as soon as the vehicle body has been partially tilted. However, the cut-off will become effective also as soon as the tilting has been started, providing the side door on the downward side is for some reason or another prevented from opening or tilting down. However, the improvement leaves it possible to override the safety features above described and manually complete the tilting of the dump body. The special construction involved in the device effectively prevents the operation of the dumping cylinder on the downward or inoperative side of the vehicle.

The drawings show a rail vehicle 11 designed for the transport and discharge of fluent solid material as outlined above. It will of course be understood that the invention is equally adaptable for road vehicles as well.

The vehicle includes customary trucks 12 which support the underframe 13. This underframe may consist primarily of two longitudinal vertical I-beams 14, 14 with an upper plate 15 and a lower plate 16. This underframe rests upon trunnion supports 17, 17 on the underframe 13. The underframe 13 has bolsters 18, 18 extending laterally in each direction and spaced along the underframe. Each bolster 18 has a rocking pivot 19 which carries a cylinder 20 for compressed air or similar fluid. A piston 21 moves longitudinally of each cylinder and serves as the means for tilting the vehicle body.

The vehicle body comprises a bottom 22. The bottom 22 has cross brackets 23 provided with pivots 24. These pivots 24 extend longitudinally of the vehicle and form hinges for ribs 25 which extend through slots in the depending side portions of the bottom. The ribs 25 support the side doors 26 which extend substantially the length of the vehicle body.

The cross bracket 23 also carry journal bearings 27 which rest upon the trunnion supports 17 and support the vehicle body on each side of the underframe. The journal bearings 27 form pivots for operating arms 28. The latter are pivotally connected by links 29 to the inner ends of the ribs 25. The operating arm 28 with its particular linkage which functions in controlling the down-tilting doors both in normal holding position and also in positions of discharge, is described in detail in my Patent No. 2,826,999 of March 18, 1958, to which reference is made for further details.

Each cylinder 20 is supplied by compressed fluid such as air through a three-way rocker valve 30 mounted on a beam 14 of the underframe 13. This rocker valve is controlled in turn by a torque tube 31 running longitudinally through the brackets 18 on each side of the underframe 13. The valve itself is similar to what is disclosed in my patent granted March 20, 1956, No. 2,738,733.

Figure 5:
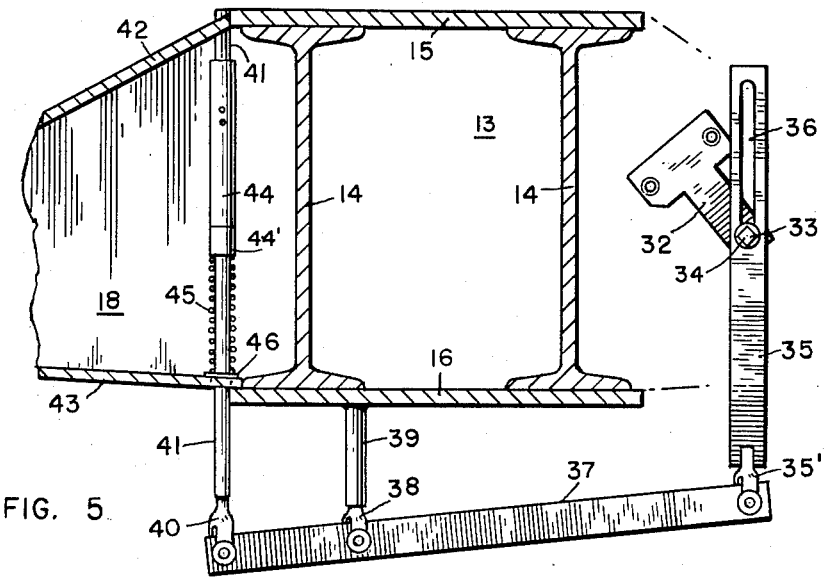
FIG. 5 is an enlarged end elevation of the dump valve and cut-off assembly on the underframe of the vehicle with the push rod in depressed position as indicated in FIGURE 7.
Figure 6:
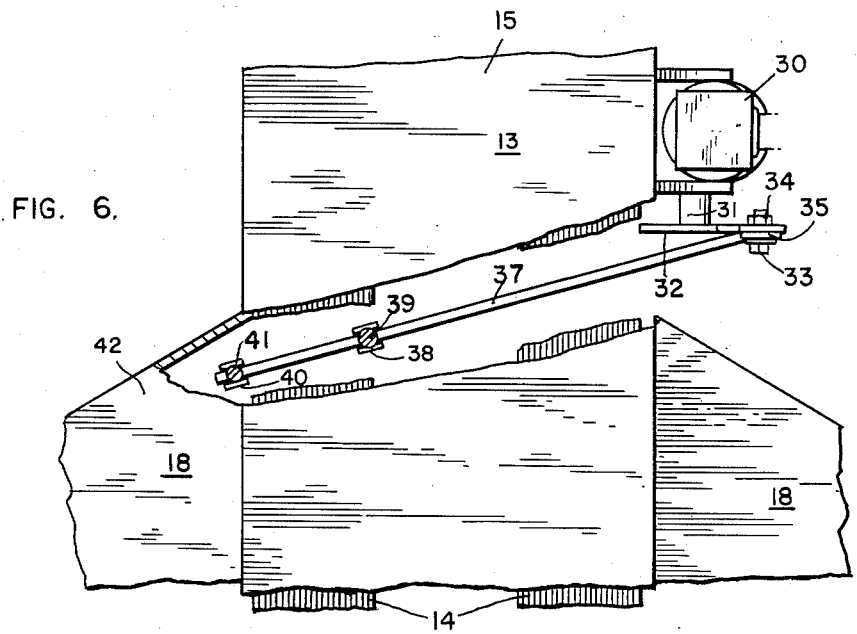
FIG. 6 is an enlarged plan view partly broken away of the dump valve and cut-off assembly.

The end of each control torque tube or shaft 31 carries a fixed cut-off crank 32 (FIG. 5). The end of the crank 32 carries a bolt 33 having a nut 34. The bolt 33 forms a pivot for a vertical bar 35. This bar is slotted in its upper portion as shown at 36, to permit loose up and down movement along the pivot bolt 33.

The lower end of the bar 35 has a yoke 35' in which there is pivoted one end of a lever 37. At an intermediate point, the lever 37 is pivoted on a yoke 38 forming an extension of a dependent fulcrum bar 39.

The opposite end of the lever 37 carries a pivoted yoke 40 forming an extension on a vertical rod 41.

This rod 41 is loosely journaled in the top member 42 of the side bolster 18 and is located under the inner end of an operating arm 28. The rod 41 passes through an enlarged opening in the lower web 43 of the bracket 18 so that it will not bind when the lever 37 is rocked. Between the webs 42 and 43 the rod 41 carries a stop sleeve 44 which is adjustably supported on the rod by nut 44'. The rod beneath the stop 44 carries a spiral compression spring 45 which rests upon a loose washer 46 on the lower web 43. The spring 45 is under sufficient compression so it normally raises the rod 41 until the stop 44 strikes the web 42. In this position the rod 41 projects above the upper plate 15 of the underframe.

The slot 36 is barely long enough to allow the torque tube 31 to rotate fully between exhaust and inlet positions on the valve 30 when the top of the cut-off rod 41 is fully depressed as shown in the position on FIG. 5. The cut-off rod 41 will be fully depressed by the inner end of the opposite door operating lever 28 as long as the inner end of the opposite door operating lever 28 rests upon the underframe 13.

Figure 4:
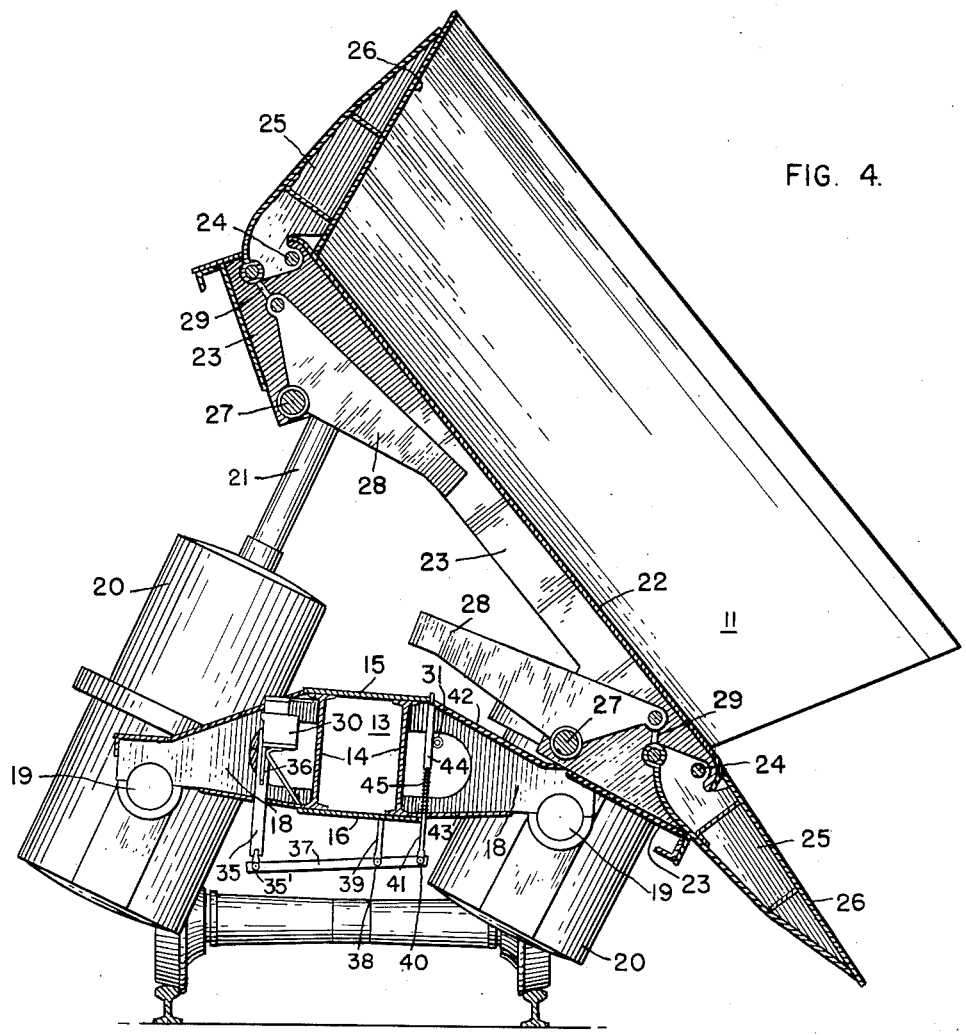
FIG. 4 is a transverse vertical section on the line 4—4 in FIG. 2 of the vehicle in discharging or dumping position.

If, however, the operating lever 28 rises, for example when the vehicle body is in a dumping or discharging position as shown in FIG. 4, then the spring 45 forces the rod 41 upward until the stop 44 contacts the bracket member 42. Lever 37 then rotates about the pivot 38, pulling the bar 35 down. The total travel of the rod 41 and the location of the cut-off yoke 35', are so chosen that when the rod 41 is in its uppermost position, the upper end of the slot 36 bears against the bolt 33 and prevents the torque tube 31 from being rotated past the intermediate or lap position, unless sufficient twisting force is applied to compress the cut-off spring 45.

Manual operation of the torque tube 31 is effected by means of a counter-weighted rock arm 47 (FIG. 3). The lower end of this rock arm 47 is pivoted to a link 48 connected to the inner arm 49 by an operating handle 50. The operating handle 50 is pivoted as at 51 to a depending bracket 53 connected to the underframe 13.

While the cut-off rod 41 is in its lowest position, i.e., when the door operating member 28 rests upon the underframe 13, the valve 30 can be operated freely in the exhaust, lap and inlet positions.

When, however, the rod 41 is in the raised position, that is, when the door operating member 28 is rotated out of contact with the underframe 13, the valve 30 may be operated freely only in the exhaust and lap positions. To again press the valve 30 into the inlet position requires considerable increased force of the operating hand lever to overcome spring 45.

Figure 7:
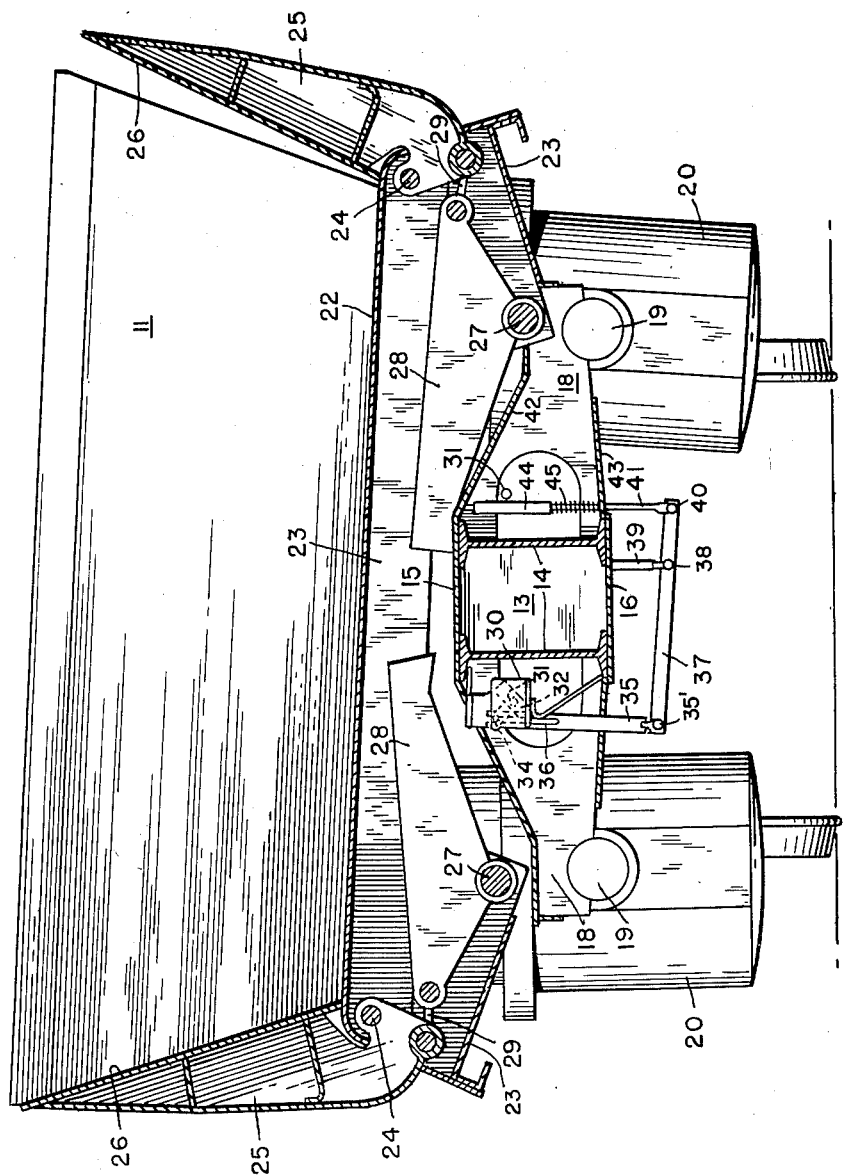

It will be evident, therefore, that as the operating dump cylinder tilts the dumping body to a predetermined angle, the operating member 28 will automatically cut off the compressed air and maintain the valve 30 either in exhaust or lap positon. It is to be understood that in normal operation when the dump body is tilted, the inner end of the door operating member 28 remains in contact with the top of the underframe and fully depresses the cut-off rod 41, as shown in FIG. 7, until the door 26 is fully opened to normally an angle of about 33° from the horizontal. After the dump body passes this angle, the back of the door hinge 25 contacts the dump body 22 and causes the operating member 28 to rock upward with the body, lifting its inner end free from the underframe 13 and the cut-off rod 41, as shown in FIG. 4. As a consequence the cut-off rod 41 rises under the pressure of the spring 45.

The top of the slot 36 then comes in contact with the spacer 33 and moves the crank arm 32 and the three-way valve from inlet to lap position, cutting off the air supply to the cylinders at an angle which may be predetermined by proper selection of the cut-off linkage and length of slot 36.

In case the down-tilting door fails to open, the arrangement also provides an automatic cut-off means. If the lower door 26 fails to open, door operating member 28 will immediately rotate with the pump body bottom 22 from the initial movement of dumping. By the time the vehicle body has tilted a very few degrees as shown in FIG. 8, the inner end of the door operating member 28 has risen sufficiently to allow the cut-off rod 41 to rise, thus by reason of the linkage shifting the valve 30 from inlet to lap position, cutting off further air pressure to the dumping cylinders on that side.

If, however, it is desired manually to increase the tilting movement, the cut-off means can be overridden by applying increased force to the dump lever 50. It will be evident from FIGS. 3 and 4 that the cut-off rod 41 can be depressed fully if sufficient force is applied to dump handle 50 to overcome the spring 45 and compress it. The valve 30 will then be in an inlet position for admitting compressed air to the dump cylinders.

Provision is also made to prevent compressed air being admitted to the dump cylinders on the side of the vehicle toward which the body is being tilted. The operating member 28 on the side being elevated rises immediately with the dump body 22 (FIG. 4). This immediately releases the corresponding rod 41 and serves to prevent operation of its associated dump handle 50 so that the valve 30 on the downward side cannot be opened to raise the piston on that side without deliberate and strong effort. Thus the tiltable body will at no time be lifted off of the trunnions on both sides simultaneously.

The arrangement as described provides an effective means for controlling the operation of the discharge of the vehicle with protection against irregular movements. Thus the supply of fluid pressure to the dumping cylinders is cut off when the major part of the movement is completed. In the event of failure of the doors to open during the tilting movement, the supply of pressure is curtailed immediately. The normal movement of the load body serves to prevent the opposite tilting mechanism from operating.

The above description applies regardless of minor changes in mechanical details and proportions of parts so that the scope of the invention is limited only by the terms of the following claims.

What I claim is:

1. In combination with a wheeled vehicle having an underframe with pivoted pressure cylinders on each side, a vehicle body removably and tiltably supported on each side of the underframe, means actuated by said cylinders for selectively tilting the vehicle body, said body having sides pivoted to the body with individual operatng arms pivotally attached to the body and pivotally linked to the sides, a three-way valve on the underframe connected to the pressure cylinders on the side to be elevated, valve cut-off means on the underframe to operate said valve, and means on the underframe for actuating said valve operating means when the side operating arm is elevated.

2. In combination with a wheeled vehicle having an underframe with pivoted pressure cylinders on each side, a vehicle body removably and tiltably supported on each side of said underframe, means actuated by said cylinders for selectively tilting the vehicle body, said body having sides pivoted to the body with individual operating arms pivotally attached to the body and pivotally linked to the sides, a three-way valve on the underframe connected to the pressure cylinders on the side to be elevated, means on the underframe to operate said valve, a push-rod vertically slidable in the underframe, spring means on the rod for holding its end against an operating arm when in lowered position and linkage on the underframe connecting the rod with the cut-off valve.

3. In combination with a wheeled vehicle having an underframe with pivoted pressure cylinders on each side, a vehicle body tiltable and removably supported on each side of said underframe, means actuated by said cylinders for selectively tilting the vehicle body, said body having sides pivoted to the body with individual operating arms pivotally attached to the body and pivotally linked to the sides, a three-way valve on the underframe connected to the pressure cylinders on the side to be elevated, valve cut-off means on the underframe to operate said valve, a shaft operating the valve, a crank on the shaft, a push-rod vertically slidable in the underframe, a spring on the push-rod for holding its end against an operating arm when in lowered position and linkage between the push-rod and the crank.

4. In combination with a wheeled vehicle having an underframe with pivoted pressure cylinders on each side, a vehicle body removably and tiltably supported on each side of the underframe, means actuated by said cylinders for selectively tilting the vehicle body, said body having sides pivoted to the body with individual operating arms pivotally attached to the body and pivotally linked to the sides, a three-way valve on the underframe connected to the pressure cylinders on the side to be elevated, valve cut-off means on the underframe to operate said valve, a shaft operating the valve, a crank on the shaft, a push-rod vertically slidable in the underframe, a spring on the push-rod for holding its end against an operating arm when in lowered position and lost motion linkage between the push-rod and the crank.

5. In combination with a wheeled vehicle having an underframe with pivoted pressure cylinders on each side, a vehicle body removably and tiltably supported on each side of the underframe, means attached by said cylinders for selectively tilting the vehicle body, said body having sides pivoted to the body with individual operating arms pivotally attached to the body and pivotally linked to the sides, a three-way valve on the underframe connected to the pressure cylinders on the side to be elevated, means on the underframe to operate said valve, a push-rod vertically slidable in the underframe, spring means on the rod for holding its end against an operating arm when in lowered position, linkage on the underframe connecting the rod with the normally open cut-off valve, said operating arm being linked to the side of the body and thereby lifted from the push-rod when the side of the body remains in closed position during the tilting of the body itself.

6. In combination with a wheeled vehicle having an underframe with pivoted pressure cylinders on each side, a vehicle body removably and tiltably supported on each side of the underframe, means actuated by said cylinders for selectively tilting the vehicle body, said body having sides pivoted to the body with individual operating arms pivotally attached to the body and pivotally linked to the sides, a three-way valve on the underframe connected to the pressure cylinders on the side to be elevated, means on the underframe to operate said valve, a push-rod vertically slidable in the underframe, spring means on the rod for holding its end against an operating arm when in lowered position, linkage on the underframe connecting the rod with the normally-open cut-off valve, said operating arm being linked to the side of the body and thereby lifted from the push-rod after the side of the body is in open discharge position and the vehicle body has approached fully tilted position.

References Cited in the file of this patent

UNITED STATES PATENTS

| | | |
|---|---|---|
| 513,447 | Trapp | Jan. 23, 1894 |
| 1,245,382 | Rhodes | Nov. 6, 1917 |
| 1,722,830 | Viberg et al. | July 30, 1929 |
| 1,972,042 | Flowers | Aug. 28, 1934 |
| 1,983,280 | Flowers | Dec. 4, 1934 |
| 2,143,546 | Day | Jan. 10, 1939 |
| 2,200,271 | Flowers | May 14, 1940 |
| 2,428,629 | Kordish et al. | Oct. 7, 1947 |
| 2,588,133 | Lunde | Mar. 4, 1952 |
| 2,738,733 | Flowers | Mar. 20, 1956 |